United States Patent
Chen et al.

(10) Patent No.: US 9,590,749 B2
(45) Date of Patent: Mar. 7, 2017

(54) TERMINAL AND METHOD FOR CALCULATING CHANNEL QUALITY INDICATION INFORMATION

(75) Inventors: Yijian Chen, Shenzhen (CN); Jun Xu, Shenzhen (CN); Yu Ngok Li, Shenzhen (CN); Bo Dai, Shenzhen (CN); Junfeng Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 216 days.

(21) Appl. No.: 14/400,603

(22) PCT Filed: Dec. 21, 2011

(86) PCT No.: PCT/CN2011/084330
§ 371 (c)(1),
(2), (4) Date: Nov. 12, 2014

(87) PCT Pub. No.: WO2012/155511
PCT Pub. Date: Nov. 22, 2012

(65) Prior Publication Data
US 2015/0249511 A1    Sep. 3, 2015

(30) Foreign Application Priority Data
Aug. 15, 2011    (CN) .......................... 2011 1 0233125

(51) Int. Cl.
*H04B 7/06*        (2006.01)
*H04B 17/309*    (2015.01)
(Continued)

(52) U.S. Cl.
CPC .......... *H04B 17/309* (2015.01); *H04B 7/046* (2013.01); *H04B 7/0452* (2013.01);
(Continued)

(58) Field of Classification Search
None
See application file for complete search history.

(56) References Cited

U.S. PATENT DOCUMENTS

| 2011/0165846 | A1  | 7/2011 | Zheng et al. | |
|---|---|---|---|---|
| 2014/0126476 | A1* | 5/2014 | Kang | H04L 1/0026 370/328 |
| 2014/0226509 | A1* | 8/2014 | Ko | H04B 7/0626 370/252 |

FOREIGN PATENT DOCUMENTS

| CN | 102045762 A | 5/2011 |
|---|---|---|
| CN | 102055547 A | 5/2011 |

(Continued)

*Primary Examiner* — Huy D Vu
*Assistant Examiner* — Teisha D Hall
(74) *Attorney, Agent, or Firm* — Ling Wu; Stephen Yang; Ling and Yang Intellectual Property

(57) ABSTRACT

Disclosed in the present document are a method and terminal for calculating channel quality indication information. The method includes: a terminal performing a channel measurement according to a received cell state information-reference signal (CSI-RS) or cell reference signal (CRS), determining a channel state information (CSI) reference resource, and determining channel quality indication (CQI) calculation conditions, then the terminal calculating a CQI value corresponding to the CSI reference resource according to the determined conditions and the measurement result. The present document makes a reasonable setting of the CQI calculation conditions, and ensures performance and effectiveness of system link self-adaptation.

18 Claims, 1 Drawing Sheet

(51) Int. Cl.
*H04L 1/00* (2006.01)
*H04B 7/04* (2006.01)
*H04L 25/02* (2006.01)

(52) U.S. Cl.
CPC ......... *H04B 7/0456* (2013.01); *H04B 7/0486* (2013.01); *H04B 7/063* (2013.01); *H04B 7/0632* (2013.01); *H04B 7/0639* (2013.01); *H04B 7/0689* (2013.01); *H04L 1/0026* (2013.01); *H04L 25/0202* (2013.01)

(56) References Cited

FOREIGN PATENT DOCUMENTS

| | | | |
|---|---|---|---|
| CN | 102082636 | A | 6/2011 |
| CN | 102111246 | A | 6/2011 |
| CN | 102131225 | A | 7/2011 |
| WO | 2009088225 | A2 | 7/2009 |

* cited by examiner

TERMINAL AND METHOD FOR CALCULATING CHANNEL QUALITY INDICATION INFORMATION

TECHNICAL FIELD

The present document relates to the field of mobile wireless communications, and more particularly, to a terminal and method for calculating channel quality indication information for a particular transmission mode in a wireless communication system.

BACKGROUND

In the wireless communication technology, when a base station side (such as evolved Node B, that is, eNB) transmits data with a plurality of antennas, spatial multiplexing may be used to increase the data transfer rate, that is, the transmitting end uses the same time-frequency resource to transmit different data at different antenna positions, and the receiving end (such as the user equipment (UE)) also uses a plurality of antennas to receive the data. In the case of a single user, the resources of all antennas are assigned to the same user, and this user alone occupies the physical resources allocated by the base station within one transmission interval, this transmission method is called a single user multiple-input multiple-output (referred to as SU-MIMO); in the case of multiple users, the spatial resources of different antennas are allocated to different users, one user and at least one another user share the physical resources allocated by the base side within one transmission interval, the sharing method can be space division multiple access or space division multiplexing, and this transmission method is called Multiple User Multiple-Input Multiple-Out-put (referred to as MU-MIMO), in which the physical resources allocated by the base station refer to the time-frequency resources. If the transmission system needs to simultaneously support the SU-MIMO and MU-MIMO, the eNB needs to provide the data in these two modes for the UE. Both in the SU-MIMO mode and the MU-MIMO mode, the UE needs to know the rank used by the eNB for the transmission of the MIMO data. In the SU-MIMO mode, the resources of all antennas are allocated to the same user, the number of layers used to transmit the MIMO data is equal to the rank used by the eNB for transmitting the MIMO data; in the MU-MIMO mode, the number of layers corresponding to one user transmission is less than the total number of layers for the eNB transmitting the MIMO data, if it needs to switch between the SU-MIMO mode and the MU-MIMO mode, the eNB needs to notify the UE of different control data in different transmission modes.

In the Long Term Evolution (LTE) system, the control signaling that needs to be transmitted in the uplink includes Acknowledgement/Negative Acknowledgement message (ACK/NACK), and three forms for reflecting the downlink physical channel state information (CSI): Channels quality indication (CQI), Pre-coding Matrix Indicator (PMI), and Rank Indicator (RI).

The CQI is an indicator used to measure the grades of the downlink channel quality. The CQI is represented with integer values from 0 to 15 in the 36-213 protocol, an the values respectively represent different CQI grades, and different CQIs correspond to their own MCS, see Table 1. The CQI grade selection should follow the following guidelines: the selected CQI grade is such that the block error rate of the PDSCH transmission block corresponding to said CQI in the corresponding MCS does not exceed 0.1.

Based on a non-limiting detection interval in the frequency domain and the time domain, the UE acquires the highest CQI value, corresponding to each maximum CQI value reported in the uplink sub-frame n. The range of the CQI serial numbers is 1-15 and satisfies the following condition, and if the CQI serial number 1 does not satisfy the condition, the CQI serial number is 0: the error rate of a single PDSCH transmission block does not exceed 0.1 when being received, and the PDSCH transmission block comprises the joint information: the modulation method and transmission block size, which corresponds to one CQI serial number and the occupied a set of downlink physical resource blocks, that is, the CQI reference resource. Wherein, said highest CQI value refers to the maximum CQI value when ensuring the BLER not greater than 0.1, and this helps to control the resource allocation. Generally, smaller the CQI value is, more resources are occupied, and better the BLER performance is.

The joint information of the transmission block size and the modulation method corresponds to a CQI serial number, if: according to the transmission block size, this joint information transmitted by the PDSCH in the CQI reference resource can be notified with signaling, in addition: the modulation scheme is characterized with the CQI serial number and is used in the joint information including the transmission block size and the modulation scheme in the reference resource, and the effective channel code rate produced by it is the effective channel code rate that is possibly closest to the one that can be characterized by the CQI serial number. When there is more than one joint information and they all can produce effective channel code rates that are similarly close to the one characterized by the CQI serial number, the joint information with the smallest transmission block size is used.

Each CQI serial number corresponds to one modulation scheme and one transmission block size, the correspondence between the transmission block size and the NPRB is shown in Table 1. The code rate can be calculated based on the transmission block size and the NPRB size.

TABLE 1

4-bit CQI Table

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

There are a lot of definitions on CQI in the LTE, and depending on different principles, the CQI can be divided:
according to the measurement bandwidth, the CQI can be divided into wideband CQI and subband CQI;

said wideband CQI refers to channel state indications of all the subbands, and what is obtained is the CQI information of the sub band set S;

the subband CQI is the CQI information for each subband. Depending on different system bandwidths, the LTE divides the RB corresponding to the effective bandwidth into a plurality of RB groups, and each RB group is called a subband.

The subband CQI can further be divided into full subband CQI and Best M CQI: and the full subband CQI reports the CQI information of all subbands; the Best M CQI is M subbands selected from the subband set S, and the CQI information of said M subbands are reported, and the location information of these M subbands are reported simultaneously.

According to the number of code streams, the CQI can be divided into single stream CQI and dual stream CQI;

single stream CQI: used in the single-antenna transmission port 0, port 5, transmit diversity, MU-MIMO, the closed-loop spatial multiplexing of RI=1, and at this time, the UE reports the CQI information of the single code stream;

dual stream CQI: used in closed-loop spatial multiplexing mode. For the open-loop spatial multiplexing mode, since the channel state information is unknown, and the dual-stream characteristic is equalized in the precoding, under the open-loop spatial multiplexing, the CQIs of the two code streams are equal.

The CQI can be divided into absolute value CQI and differential CQI according to the CQI representation method;

the absolute value CQI is the CQI index represented with 4 bit in Table 1;

differential CQI is the CQI index represented with 2 bit or 3 bit; the differential CQI is further divided into differential CQI of the second code stream with respect to the first code stream, and differential CQI of the subband CQI with respect to the subband CQI.

According to the CQI reporting method, the CQI is divided into wideband CQI, UE selected (subband CQI), and High layer configured (subband CQI);

wideband CQI refers to the CQI information of the subband set S;

UE selected (subband CQI) is the Best M CQI, and feeds back the CQI information of the selected M subbands, and reports the position of the M subbands at the same time;

High layer configured (subband CQI) is the whole subband CQI, and for each sub-band, feeds back one CQI information.

The High layer configured and the UE selected are subband CQI feedback method, and in the aperiodic feedback mode, the subband sizes defined in these two feedback methods are inconsistent; in the UE selected mode, M size is also defined.

In the LTE system, the ACK/NACK response message is transmitted in the physical uplink control channel (PUCCH) in the format of 1/1a/1b (PUCCH format 1/1a1/b), when the terminal (UE: User Equipment) needs to transmit the uplink data, it transmits the data in the physical uplink shared channel (PUSCH), and the CQI/PMI and RI feedback may be a periodic feedback, or an aperiodic feedback, and the specific feedback is shown in Table 2:

TABLE 2 uplink physical channels corresponding to the periodic feedback and aperiodic feedback

| Scheduling Mode | Periodic CQI report channel | Aperiodic CQI report channel |
| --- | --- | --- |
| Frequency non-selective | PUCCH | |
| Frequency selective | PUCCH | PUSCH |

Wherein, for the periodically fed-back CQI/PMI and RI, if the UE does not need to send the uplink data, the periodically fed-back CQI/PMI and RI are transmitted on the PUCCH in the format of 2/2a/2b (PUCCH format2/2a/2b), if the UE needs to transmit the uplink data, the CQI/PMI and RI are transmitted on the PUSCH; for the aperiodically fed-back CQI/PMI and RI, they are transmitted only on the PUSCH.

The Long-Term Evolution (abbreviated as LTE) Release 8 standards defined the following three downlink physical control channels: Physical Control Format Indicator Channel (referred to as PCFICH), Physical Hybrid Automatic Retransmission Request Indicator Channel (referred to as PHICH) and Physical Downlink Control Channel (referred to as PDCCH). Wherein the PDCCH is used to carry the downlink control information (referred to as DCI), comprising: downlink and uplink scheduling information, and uplink power control information. The DCI format is divided into the following types: DCI format 0, DCI format 1, DCI format 1A, DCI format 1B, DCI format 1C, DCI format 1D, DCI format 2, DCI format 2A, DCI format 3 and DCI format 3A, and so on; wherein the transmission mode 5 supporting the MU-MIMO uses the downlink control information of the DCI format 1D, the Downlink power offset field $\delta_{power-offset}$ in the DCI format 1D is used to indicate the information that a user's power is halved (i.e. −10 log 10(2)) in the MU-MIMO mode, since the MU-MIMO transmission mode 5 only supports the MU-MIMO transmission of two users, with this downlink power field, the MU-MIMO transmission mode 5 may support the dynamic switching of the SU-MIMO mode and the MU-MIMO mode, but regardless whether it is in the SU-MIMO mode or the MU-MIMO mode, the DCI format only supports one stream transmission for one UE, although the LTE Release 8 supports the single-user transmission of up to two streams in the transmission mode 4, since the switching between the transmission modes can only be semi-static, the dynamic switching between the single user multi-stream transmission and multi-user transmission cannot be achieved in the LTE release 8.

In the LTE release 9, in order to enhance the downlink multi-antenna transmission, the double beamforming transmission mode is introduced, and is defined as the transmission mode 8, while the downlink control information adds the DCI format 2B to support such a transmission mode, an identity bit of scrambling identity (referred to as SCID) in the DCI format 2B is used to support two different scrambling sequences, and the eNB can allocate these two scrambling code sequences to different users, and multiplexes multiple users in the same resource. Furthermore, when there is only one transmission block enabled, new data indicator (NDI) bit corresponding to the disabled transmission block is also used to indicate the antenna port in single-layer transmission.

Furthermore, in the LTE release 10, in order to further enhance the downlink multi-antenna transmission, a new closed-loop spatial multiplexing transmission mode is added and defined as the transmission mode 9, and the downlink control information adds the DCI format 2C to support this transmission mode, and this transmission mode can support both the single user SU-MIMO and also the multi-user MU-MIMO, and it can support the dynamic switching between these two, moreover this transmission mode further supports the 8-antenna transmission. This new transmission mode has decided to use the UE Specific Reference Signal (referred to as the URS) as the pilot for demodulation, and the UE needs to obtain the pilot location to estimate the channel and interference on the pilot.

In the R10 version, the UE is semi-statically configured through the high layer signaling to receive the PDSCH data transmission according to the PDCCH indication of a UE-Specific searching space based on one of the following transmission modes:

Transmission mode 1: single-antenna port; port 0
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop Rank=1 precoding
Transmission mode 7: Single-antenna port; port 5
Transmission mode 8: dual-stream transmission, namely double beamforming
Transmission mode 9: up to 8 layer transmission In the R10 version, the transmission mode 9 and Channel-State Information-Reference Symbol (CSI-RS) are newly added, and the transmission mode 9 performs the channel measurement based on the CSI-RS or the CRS (Cell-specific reference signals) to calculate and obtain the CQI. Other transmission modes perform channel measurement based on the CRS, so as to calculate the CQI. In the R10 version, it also correspondingly adds some CSI-RS parameters to characterize its properties. Compared to the CRS in the R8, some parameters are similar, and some other parameters are new. For example, the number of CSI-RS ports has a similar number of CRS ports in the R8, while the CSI RS sub-frame configuration periodic parameter is new. The following parameters are cell specific and configured by the higher layer signaling, and are used to define the CSI-RS, comprising: the number of CSI-RS ports, CSI RS configuration, CSI RS subframe configuration parameter ICSI-RS, sub-frame configuration cycle TCSI-RS, sub-frame offset and an assumption of controlling the reference PDSCH transmission power used by the UE for the CSI feedback.

In the frequency domain, the CSI reference resource is defined by a set of downlink physical resource blocks, and the downlink physical resource blocks correspond to the frequency band corresponding to the source CQI value; in the time domain, the CSI reference resource is defined with a downlink subframe; on the transmission layer domain, the CSI reference resource is defined with any RI and PMI, wherein the CQI is based on the PMI/RI.

SUMMARY

In the R10, for the transmission mode 9, because of the introduction of the new concept "double codebook" or "double-PMI", it requires to feedback two PMIs; for 8 antennas, the first PMI indicates the wideband channel state information, the second PMI indicates the subband channel state information, only when two PMI are acquired is the entire precoding matrix information acquired, wherein the subband comprises the broadband condition; for 2 antennas and 4 antennas, the first PMI indicates the unit matrix, and the second PMI equals to the PMI in the original R8 protocol.

For the new transmission mode 9 in the R10 protocol, the CQI determination and calculation lack of the consideration of necessary conditions, the absence of such a condition results in that the transmission mode 9 cannot obtain the accurate channel quality information, which seriously reduces the flexibility and performance of the system.

The technical problem to be solved in the present document is to provide a terminal and a method for calculating channel quality indication information, and the method that is used to perform a channel measurement based on the reference signal, and then obtain channel quality indication information, this method takes into account the impact of a variety of factors on the CQI calculation, and considers the effect of various complex conditions on the CQI calculation, so as to solve the problem that the existing system cannot obtain the accurate channel quality indication information when using the transmission mode 9, and improve the flexibility and performance of the system.

The present document provides a method for calculating channel quality indication information, comprising: a user equipment (UE) performing a channel measurement based on a received Channel-State Information-Reference Symbol (CSI-RS) or a cell-specific reference signal (CRS), and determining a channel state information (CSI) reference source and determining channel quality indicator (CQI) calculation conditions, and thereafter said UE calculating a CQI value corresponding to said CSI reference resource according to said determined conditions and a measurement result Preferably, the determined CQI calculation conditions comprise, for the transmission mode 9:

when no precoding matrix indicator PMI/rank indication RI is configured, if the number of physical broadcast channel (PBCH) antenna ports is 1, the transmission mode being configured as single-antenna port transmission;

when no PMI/RI is configured, if the number of PBCH antenna ports is greater than 1, the transmission mode is configured as transmit diversity;

When said PMI/RI is configured, the transmission mode is configured as up to 8 layer transmission.

Preferably, said determined CQI calculation conditions comprise, for said transmission mode 9:

when no PMI/RI is configured, if the number of PBCH antenna ports is 1, the transmission mode is configured as single-antenna port transmission;

when not configured with PMI/RI, if the number of PBCH antenna ports is greater than 1, said transmission mode is configured as said transmit diversity;

when said PMI/RI is configured, if the number of CSI-RS ports is 1, the transmission mode is configured as single-antenna port transmission, when the number of CSI-RS ports is greater than 1, the transmission mode is configured as up to 8 layer transmission.

Preferably, said up to 8 layer transmission comprises up to 8 layer closed-loop spatial multiplexing transmission and open-loop single-layer transmission.

Preferably, said up to 8 layer transmission refers to up to 8 layer closed-loop spatial multiplexing transmission.

Preferably, when said UE is configured with said PMI/RI, and the number of CSI-RS ports is greater than 1, said transmission mode is configured as up to 8 layer closed-loop spatial multiplexing transmission;

When said UE is configured with said PMI/RI, and the number of CSI-RS ports is equal to 1, said transmission mode is configured as open-loop single layer transmission.

Preferably, said up to 8 layer closed-loop spatial multiplexing transmission comprises up to 8 layer SU-MIMO, and up to 4 layer MU-MIMO.

Preferably, said up to 4 layer MU-MIMO supports four users and one layer transmission for each user, or supports two users and two layer transmission for each user.

Preferably, said determined CQI calculation conditions comprise, regardless whether the current sub-frame is a multicast broadcast-single frequency network (MB-SFN) subframe or non-multicast broadcast-single frequency network (MB-SFN) subframe, when said UE calculates said CQI, it calculates a CRS overhead of said current subframe in accordance with said non MB-SFN subframe.

Preferably, said channel measurement comprises that, if a base station is not configured with said PMI/RI, said UE performs a channel measurement based on said CRS; if said base station is configured with said PMI/RI, said UE performs said channel measurement based on said CSI-RS.

The present document further provides a terminal for calculating channel quality indication information, said terminal comprising:

a receiving module, configured to: receive a Channel-State Information-Reference Symbol (CSI-RS) and/or a cell-specific reference signal (CRS)transmitted by a base station;

a measuring module, configured to: perform a channel measurement according to said CSI-RS or CRS;

a determining module, configured to: determine a channel state information CSI reference resource and channel quality indication (CQI) calculation conditions;

a calculating module, configured to: calculate a CQI value corresponding to said CSI reference resource in accordance with said determined conditions and a measurement result.

Preferably, said determining module is further configured to: said determined CQI calculation conditions comprise, for transmission mode 9:

when no precoding matrix indicator (PMI)/rank indication (RI) is configured, if the number of PBCH antenna ports is 1, the transmission mode is configured as single-antenna port transmission;

when no PMI/RI is configured, if the number of PBCH antenna ports is greater than 1, the transmission mode is configured as transmit diversity;

When said PMI/RI is configured, the transmission mode is configured as up to 8 layer transmission.

Preferably, said determining module is further configured to: said determined CQI calculation conditions comprise, for said transmission mode 9:

when no PMI/RI is configured, if the number of PBCH antenna ports is 1, said transmission mode is configured as single-antenna port transmission;

when no PMI/RI is configured, if the number of PBCH antenna ports is greater than 1, said transmission mode is configured as transmit diversity;

When said PMI/RI is configured, if the number of CSI-RS ports is 1, said transmission mode is configured as single-antenna port transmission, if the number of CSI-RS ports is greater than 1, said transmission mode is configured as up to 8 layer transmission.

Preferably, said up to 8 layer transmission comprises up to 8 layer closed-loop spatial multiplexing transmission and open-loop single-layer transmission.

Preferably, said up to 8 layer transmission refers to up to 8 layer closed-loop spatial multiplexing transmission.

Preferably, said determining module is further configured to: when said terminal is configured with PMI/RI and the number of CSI-RS ports is greater than 1, said transmission mode is configured as up to 8 layer closed-loop spatial multiplexing transmission;

When said terminal is configured with said PMI/RI, and the number of CSI-RS ports is equal to 1, said transmission mode is configured as open-loop single layer transmission.

Preferably, said up to 8 layer closed-loop spatial multiplexing transmission comprises up to 8 layer SU-MIMO, and up to 4 layer MU-MIMO.

Preferably, said up to 4 layer MU-MIMO supports four users and one layer transmission for each user, or supports two users and two layer transmission for each user.

Preferably, said determined CQI calculation conditions comprise, regardless whether the current sub-frame is a MB-SFN sub-frame or a non MB-SFN subframe, when said terminal calculates the CQI, it calculates a CRS overhead of the current subframe in accordance with the non MB-SFN subframe.

Preferably, said channel measurement comprises: if said base station is not configured with said PMI/RI, said terminal performs a channel measurement based on said CRS, if said base station is configured with said PMI/RI, said terminal performs said channel measurement based on said CSI-RS.

In summary, With the solution provided in the embodiment of the present document, without increasing any system complexity and signaling overhead, for the transmission mode 9, it provides a setting for calculating the CRS overhead of the CQI in the case of MBSFN subframes, so as to solve the problem that the base station does not know the UE's CRS overhead, and further ensure the accuracy of calculating the channel quality indication in the case of the transmission mode 9 and the MB-SFN sub-frame, and ultimately improve the system performance. The CQI calculation method in the present document fully considers the effect of the assumed transmission mode on the CQI calculation in the case of the transmission mode 9, and gives a reasonable transmission mode assumption in different configurations conditions, so as to ensure the CQI accuracy of the demodulated data. It makes a reasonable setting on the data CQI calculation conditions, and ensures the performance and effectiveness of system link self-adaptation.

PREFERRED EMBODIMENTS OF THE PRESENT

Figure 1:
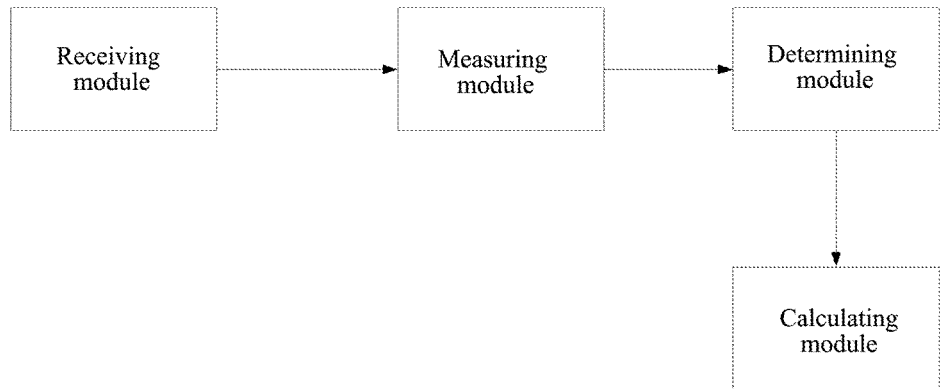
FIG. 1 is a schematic diagram of the structure of a terminal in accordance with an embodiment of the present document.

The present document provides a terminal and method for calculate channel quality indication information, and the terminal performs the channel measurement according to the received CSI-RS or CRS, and determines the CSI reference resource and determines CQI calculation conditions, and thereafter the terminal calculates the CQI value corresponding to the CSI reference resource according to the determined conditions and the measurement results.

Before introducing the technical scheme of the present document, first briefly introduce the CSI reference resource and necessary conditions for calculating the CSI with the CQI reference resources;

First, the CSI reference resource is illustrated from three aspects: time domain, frequency domain, and transmission domain.

In the frequency domain, said CSI referencere source is defined with a set of downlink physical resource blocks, and said resource blocks correspond to a segment of bandwidth associated with the obtained CQI value;

In the time domain, said CSI reference resource is defined with a unique downlink subframe n-nCQI_ref;

Herein, for the periodic CSI report, said nCQI_ref is a minimum value greater than or equal to 4, and the purpose is that it can correspond to a valid downlink subframe.

Herein, for the aperiodic CSI report, said nCQI_ref is the following subframe: said reference resources appear in said valid subframe that is the same as the sub-frame corresponding to the CSI request, wherein said CSI request appears in an uplink DCI format (downlink control indicator format).

Herein, for the aperiodic CSI report, $n_{CQI\_ref}$ is equal to 4, and the downlink subframe $n-n_{CQI\_ref}$ corresponds to a reasonably valid downlink subframe, herein the downlink subframe n-nCQI_ref is received after the subframe having the corresponding CSI request, and said CSI request appears in a random access response grant.

If the following conditions are satisfied, a downlink subframe in the serving cell is considered as reasonable, and these conditions comprise:

(1) it is configured as a downlink subframe used by the user.

(2) besides for the transmission mode 9, it is not a MBSFN subframe.

(3) when the length of the DwPTS is $7680 \cdot T_s$ or less, it does not comprise a DwPTS field.

(4) for said UE, it does not fall into a configured measurement gap.

(5) for the periodic CSI report, when said UE is configured with a CSI subframe set, it is an element in said CSI subframe set, and said subframe set has a relationship with said periodic CSI report.

If this CSI reference source does not have a reasonable downlink subframe in a serving cell, the CSI report of the serving cell in the uplink subframe n can be ignored.

In the transmission domain, said CSI reference resource is defined with PMI and RI, and the CQI takes the PMI and RI as the conditions.

Then, it still needs to satisfy the following necessary conditions when using the CSI reference resource for the CQI calculation:

In said CSI reference resource, said UE should do the following assumptions to calculate the CQI serial number:

The first 3 OFDM symbols are used for control signal;

no resource particles are used for primary/secondary synchronization signal or PBCH (Physical Broadcast Channel);

CP length of the non-MBSFN subframe;

Redundancy version 0.

If said CSI-RS is used for channel measurement, the ratio of the PDSCH EPRE to the CSI-RS is given;

Assuming that the CSI-RS (channel state information reference symbol) or zero power CSI-RS does not have the CSI reference resource to use.

It is assumed that the PRS (positing reference signal) does not have the CSI reference resource to use.

The PDSCH transmission scheme is determined based on the currently configured UE transmission mode.

If the CRS is used for a channel measurement, the ratio of the PDSCH EPRE to the cell specific RS EPRE is given, while $\rho_A$ is not considered. Said $\rho_A$ should be based on the following assumptions:

If said UE is configured as the transmission mode 2 having 4 cell-specific antenna ports, or transmission mode 3 having 4 cell-specific antenna ports and the associated RI value is 1, for any modulation scheme, $\rho_A = P_A + \Delta_{offset} + 10 \log_{10}(2)$ [dB];

Otherwise, for any modulation scheme and any number of layers, $\rho_A = P_A + \Delta_{offset}$ [dB].

The offset $\Delta_{offset}$ is given by the parameter nomPDSCH-RSs-EPRE-Offset configured by the upper layer signaling.

Terminal Embodiment

The present embodiment provides a terminal for calculating channel quality indication information, as shown in FIG. 1, comprising a receiving module, a measuring module, a determination module, a calculating module, and a sending module;

said receiving module is used for receiving the CSI-RS and/or CRS sent by the base station;

said measuring module is used for perform the channel measurement according to said CSI-RS or CRS;

said determining module is used for determining the CSI reference resource and the CQI calculation conditions;

said calculating module is used for calculating the CQI value corresponding to said CSI reference resource based on the determined conditions and the measurement results.

Specifically, the CQI calculation conditions determined by said determining module comprises:

(A) regardless whether said current sub-frame is a multicast broadcast-single frequency network (MB-SFN) subframe or non MB-SFN subframe, when said terminal calculates the CQI, it calculates the CRS overhead of the current subframe in accordance with said non MB-SFN subframe.

(B) said determined CQI calculation conditions comprise, for the transmission mode 9:

(1) when no PMI/RI is configured, if the number of PBCH antenna ports is 1, the transmission mode is configured as single-antenna port transmission;

(2) when no PMI/RI is configured, if the number of PBCH antenna ports is greater than 1, said transmission mode is configured as transmit diversity;

(3) when said PMI/RI is configured, the transmission mode is configured as up to eight layer transmission.

Specifically, said up to eight layer transmission comprises up to eight layer closed-loop spatial multiplexing transmission (when the number of CSI-RS ports is greater than 1) and the open-loop single layer transmission (when the number of CSI-RS ports is 1).

Furthermore, said up to eight layer closed-loop spatial multiplexing transmission comprises up to eight layer SU-MIMO; and up to four layer MU-MIMO.

Said up to four layer MU-MIMO supports four users and one layer for each user, or supports two users and two layers for each user.

(C) the determined CQI calculation conditions comprise, for the transmission mode 9:

(1) when no PMI/RI is configured, if the number of PBCH antenna ports is 1, the transmission mode is configured as single-antenna port transmission;

(2) when no PMI/RI is configured, if the number of PBCH antenna ports is greater than 1, the transmission mode is configured as transmit diversity;

(3) when said PMI/RI is configured, if the number of CSI-RS ports is 1, the transmission mode is configured as single antenna port transmission, if the number of CSI-RS ports is greater than one, then said transmission mode is configured as up to eight layer transmission.

Specifically, if the UE has configured said PMI/RI and the number of CSI-RS ports is greater than 1, the transmission mode is configured as up to eight layer closed-loop spatial multiplexing transmission;

Furthermore, said up to eight layer closed-loop spatial multiplexing transmission comprise up to eight layer SU-MIMO, and up to four layer MU-MIMO.

Furthermore, said up to four layer MU-MIMO supports four users and one layer for each user, or supports two users and two layers for each user.

Method Embodiment

Figure 2:
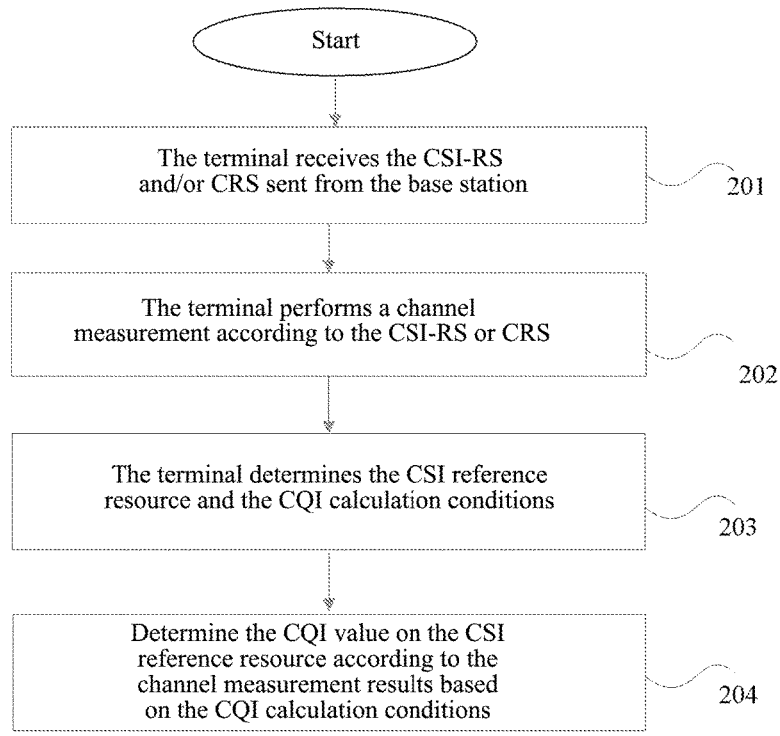
FIG. 2 is a flow chart of channel quality indication information in a method embodiment of the present document.

The present embodiment provides a method for calculating channel quality indication information, as shown in FIG. 2, comprising the following steps:

step 201: the base station sends the CSI-RS and/or CRS to the terminal;

step 202: the terminal performs a channel measurement according to the CSI-RS or CRS;

step 203: the terminal determines the CSI reference resource and the CQI calculation conditions;

step 204: the terminal calculates the CQI value corresponding to the CSI reference resource based on the determined conditions and the measurement results.

The CQI determination method comprises, for the transmission mode 9, if the eNodeB is not configured with said PMI/RI, the terminal performs a channel measurement based on said CRS, if the eNodeB is configured with said PMI/RI, the terminal performs the channel measurement based on said CSI-RS.

In the following, embodiments are used to specifically illustrate how to determine the CQI calculation conditions.

The First Embodiment

The determined CQI calculation conditions in the present embodiment comprise, for the transmission mode 9, regardless whether the current subframe is a multicast broadcast-single frequency network (MB-SFN) subframe or non-multicast broadcast-single frequency network (MB-SFN) subframe, when said terminal calculates the CQI, it calculates the CRS overhead of the current subframe in accordance with the non MB-SFN subframe.

At this point, there are two possibilities:

the first possibility is, the current subframe is a MB-SFN subframe, when calculating the CQI at this time, it needs to assume that the CRS overhead of said current subframe is calculated according to the non-MB-SFN normal subframe.

For the transmission mode 9, the MBSFN subframe exists reasonably, if the UE finds that the subframe corresponding to the CSI reference resource is a MBSFN subframe, then at this time, the data region of the MBSFN subframe does not have a CRS, then it needs to assume that there is overhead of the data field CRS, in order to be compatible with the previous versions.

The second possibility is, the current sub-frame is a non-MB-SFN normal subframe, naturally, when calculating the CQI at this time, the CRS overhead of the current subframe is not calculated according to the non-MB-SFN normal subframe.

Herein, the current subframe refers to the subframe where the CSI reference resource is located.

In short, herein the CQI calculation method fully considers that the data region has the CRS overhead in the case of non MB-SFN subframe, while in the case of MB-SFN subframe, the data region does not have the CRS overhead, and there is problem that the CRS overheads are inconsistent in different types of subframes, the solution of the present document solves the effects of the CRS overhead on the CQI calculation, and ensures the accuracy of the CQI of the demodulated data. In particular, the CQI calculation is based on the simplest scenario, that is, it excludes the effects of the reported CQI of the MB-SFN subframe and non-MB-SFN subframe as much as possible, the base station can make an appropriate adjustment or conversion on the CRS overhead when calculating the data CQI based on whether the current sub-frame is a MB-SFN sub-frame or not during scheduling, so as to ensure the performance and effectiveness of the system link self-adaptation.

The Second Embodiment

In this embodiment, the determined CQI calculation conditions comprise, for the transmission mode 9:

(1) when no PMI/RI is configured, if the number of PBCH antenna ports is 1, the transmission mode is configured as single-antenna port transmission;

(2) when no PMI/RI is configured, if the number of PBCH antenna ports is greater than 1, the transmission mode is configured as transmit diversity;

(3) when no PMI/RI is configured, the transmission mode is configured as up to eight layer transmission.

Wherein, the base station can configure the UE with PMI/RI feedback or without PMI/RI feedback through the high layer parameter pmi-RI-Report.

Furthermore, when configured with said PMI/RI, said up to eight layer transmission comprises up to eight layer closed-loop spatial multiplexing transmission (when the number of CSI-RS ports is greater than 1) and the open-loop single layer transmission (when the number of CSI-RS ports is 1).

More specifically, if said UE is configured with the PMI/RI and the number of CSI-RS ports is greater than 1, the transmission mode is configured as said up to eight layer closed-loop spatial multiplexing transmission, and the corresponding antenna ports are from 7 to 14; otherwise, the transmission mode is configured as the open-loop single layer transmission. The number of CSI-RS ports is, for example: the base station configuring the UE with eight CSI-RS ports, and the CSI-RS port numbers are from 15 to 22.

Furthermore, said up to eight layer closed-loop spatial multiplexing transmission comprises up to eight layer SU-MIMO; and up to four layer MU-MIMO.

More specifically, said up to four layer MU-MIMO supports four users, and one layer for each user, or supports two users and two layers for each user.

In short, the CQI calculation method herein fully considers the effects of the assumed transmission mode on the CQI calculation in the case of the transmission mode 9, and gives a reasonable transmission mode assumption indifferent configuration conditions, and ensures the accuracy of the CQI of the demodulated data. In particular, the CQI calculation configures the transmission mode as the up to eight layer transmission when the high layer is configured with the PMI/RI signaling, while when the high layer is not configured with the PMI/RI signaling, the transmission mode is typically configured as transmit diversity, and it has a reasonable setting on the data CQI calculation conditions, so as to ensure the performance and effectiveness of the system link self-adaptation.

The Third Embodiment

In this embodiment, the determined CQI calculation conditions comprise, for the transmission mode 9:

(1) when no PMI/RI is configured, if the number of PBCH antenna ports is 1, the transmission mode is configured as single-antenna port transmission;

(2) when no PMI/RI is configured, if the number of PBCH antenna ports is greater than 1, the transmission mode is configured as transmit diversity;

(3) when the PMI/RI is configured, if the number of CSI-RS ports is 1, the transmission mode is configured as single antenna port transmission, and if the number of CSI-RS ports is greater than one, the transmission mode is configured as the up to eight layer transmission.

Wherein, the base station can configure the UE with the PMI/RI feedback or without the PMI/RI feedback through the high layer parameter pmi-RI-Report.

Specifically, if the UE is configured with the PMI/RI and the number of CSI-RS ports is greater than 1, the transmission mode is configured as the up to eight layer closed-loop spatial multiplexing transmission;

Furthermore, said up to eight layer closed-loop spatial multiplexing transmission comprises the up to eight layer SU-MIMO and the up to four layer MU-MIMO.

More specifically, said up to four MU-MIMO supports four users and one layer for each user, or supports two users and two layers for each user.

The above description is only the embodiments of the present document and is not used to limit the present document, and for a person skilled in the art, the present document may have various changes and modifications. Any modification, equivalent replacement, and improvement made within the spirit and principle of the present document should be included within the claimed scope of the present document.

INDUSTRIAL APPLICABILITY

With the solution provided in the embodiment of the present document, without increasing any system complexity and signaling overhead, for the transmission mode 9, it provides a setting for calculating the CRS overhead of the CQI in the case of the MBSFN subframe, so as to solve the problem that the base station does not know the UE's CRS overhead, and further ensure the accuracy of calculating the channel quality indication in the case of the transmission mode 9 and the MB-SFN subframe, and ultimately improve the system performance. The CQI calculation method in the present document fully considers the effects of the assumed transmission mode on the CQI calculation in the case of the transmission mode 9, and gives a reasonable transmission mode assumption in different configurations conditions, so as to ensure the CQI accuracy of the demodulated data. It makes a reasonable setting on the data CQI calculation conditions, and ensures the performance and effectiveness of the system link self-adaptation.

What we claim is:

1. A method for calculating channel quality indication information, comprising:
    performing, by a user equipment (UE), a channel measurement based on a received Channel-State Information-Reference Symbol (CSI-RS) or a cell-specific reference signal (CRS),
    determining, by the UE, a channel state information (CSI) reference source and calculating a CQI value corresponding to said CSI reference resource and channel quality indicator (CQI) calculation conditions, and thereafter
    calculating, by the UE a CQI value corresponding to said CSI reference resource said determined conditions and according to a measurement result;
    wherein, said determined CQI calculation conditions comprises: regardless whether a current sub-frame is a multicast broadcast-single frequency network (MBSFN) subframe or non-MBSFN subframe, when said UE calculates said CQI, said UE calculates a CRS overhead of said current subframe in accordance with said non-MBSFN subframe.

2. The method of claim 1, wherein,
said determined CQI calculation conditions comprises, for a transmission mode 9:
when no precoding matrix indicator (PMI)/rank indication (RI) is configured, if a number of physical broadcast channel (PBCH) antenna ports is 1, a transmission mode being configured as single-antenna port transmission;
when no PMI/RI is configured, if the number of PBCH antenna ports is greater than 1, said transmission mode being configured as transmit diversity;
when said PMI/RI is configured, said transmission mode being configured as up to 8 layer transmission.

3. The method of claim 1, wherein,
said determined CQI calculation conditions comprises, for said transmission mode 9:
when no PMI/RI is configured, if the number of PBCH antenna ports is 1, said transmission mode being configured as single-antenna port transmission;
when no PMI/RI is configured, if the number of PBCH antenna ports is greater than 1, said transmission mode being configured as said transmit diversity;
when said PMI/RI is configured, if the number of CSI-RS ports is 1, said transmission mode being configured as single-antenna port transmission, and if said number of CSI-RS ports is greater than 1, said transmission mode being configured as up to 8 layer transmission.

4. The method of claim 2, wherein,
Said up to 8 layer transmission comprises up to 8 layer closed-loop spatial multiplexing transmission and open-loop single-layer transmission.

5. The method of claim 3, wherein,
said up to 8 layer transmission refers to up to 8 layer closed-loop spatial multiplexing transmission.

6. The method of claim 4, wherein,
When said UE is configured with said PMI/RI, and the number of CSI-RS ports is greater than 1, said transmission mode is configured as up to 8 layer closed-loop spatial multiplexing transmission;
When said UE is configured with said PMI/RI, and the number of CSI-RS ports is equal to 1, said transmission mode is configured as open-loop single layer transmission.

7. The method of claim 5, wherein,
said up to 8 layer closed-loop spatial multiplexing transmission comprises up to 8 layer single user multiple-input multiple-output (SU-MIMO), and up to 4 layer multiple user multiple-input multiple-output (MU-MIMO).

8. The method of claim 7, wherein,
said up to 4 layer MU-MIMO supports four users and one layer transmission for each user, or supports two users, and two layer transmission for each user.

9. The method of claim 1, wherein,
said channel measurement comprises performing, by the UE, a channel measurement based on said CRS if a base station is not configured with said PMI/RI and performing, by the UE, said channel measurement based on said CSI-RS if said base station is configured with said PMI/RI.

10. A terminal for calculating channel quality indication information, said terminal comprising:
a receiving module, configured to: receive a channel measurement based on a received Channel-State Information-Reference Symbol (CSI-RS) or a cell-specific reference signal (CRS) transmitted by a base station;
a measuring module, configured to: perform channel measurement according to said CSI-RS or CRS;
a determining module, configured to: determine a channel state information (CSI) reference source and channel quality indicator (CQI) calculation conditions;
a calculating module, configured to calculate a CQI value corresponding to said CSI reference resource in accordance with said determined conditions and a measurement result;
wherein, said determined CQI calculation conditions comprise: regardless of whether a current sub-frame is a multicast broadcast-single frequency network (MB-SFN) subframe, calculating a CRS overhead of said current subframe in accordance with said non MBSFN subframe when said terminal calculates the CQI.

11. The terminal of claim 10, wherein,
said determining module is further configured as that: determined CQI calculation conditions comprises, for transmission mode 9:
when no precoding matrix indicator (PMI)/rank indication (RI) is configured, if the number of PBCH antenna ports is 1, a transmission mode being configured as single-antenna port transmission;
when no PMI/RI is configured, if the number of PBCH antenna ports is greater than 1, said transmission mode being configured as transmit diversity;
when said PMI/RI is configured, the transmission mode being configured as up to 8 layer transmission.

12. The terminal of claim 10, wherein,
said determining module being further configured as that: determined CQI calculation conditions comprises, for said transmission mode 9:
when no PMI/RI is configured, if the number of PBCH antenna ports is 1, said transmission mode being configured as single-antenna port transmission;
when no PMI/RI is configured, if the number of PBCH antenna ports is greater than 1, said transmission mode being configured as transmit diversity;
when said PMI/RI is configured, if the number of CSI-RS ports is 1, said transmission mode being configured as single-antenna port transmission, if the number of CSI-RS ports is greater than 1, said transmission mode being configured as up to 8 layer transmission.

13. The terminal of claim 11, wherein,
said up to 8 layer transmission comprises up to 8 layer closed-loop spatial multiplexing transmission and open-loop single-layer transmission.

14. The terminal of claim 12, wherein,
said up to 8 layer transmission refers to up to 8 layer closed-loop spatial multiplexing transmission.

15. The terminal of claim 13, wherein, said determining module is further configured to:
when said terminal is configured with PMI/RI and the number of CSI-RS ports is greater than 1, configure said transmission mode as up to 8 layer closed-loop spatial multiplexing transmission;
when said terminal is configured with said PMI/RI, and the number of CSI-RS ports is equal to 1, configure said transmission mode as open-loop single layer transmission.

16. The terminal of claim 14, wherein,
said up to 8 layer closed-loop spatial multiplexing transmission comprises up to 8 layer SU-MIMO, and up to 4 layer MU-MIMO.

17. The terminal of claim 16, wherein,
said up to 4 layer MU-MIMO supports four users and one layer transmission for each user, or supports two users and two layer transmission for each user.

18. The terminal of claim 10, wherein,
said channel measurement comprises: if said base station is not configured with said PMI/RI, said terminal performing a channel measurement based on said CRS, and if said base station is configured with said PMI/RI, said terminal performing said channel measurement based on said CSI-RS.

* * * * *